United States Patent [19]

Maigret et al.

[11] Patent Number: 4,754,681
[45] Date of Patent: Jul. 5, 1988

[54] BOW STICK MADE OF REINFORCED RESIN FOR STRINGED INSTRUMENTS

[76] Inventors: Jean-Pierre Maigret, 20 Villepreux Hameau; Joseph Cayuela, 43 Villepreux Village, both of F 33160 Saint-Aubin-de-Medoc, France

[21] Appl. No.: 653,009
[22] PCT Filed: Dec. 31, 1982
[86] PCT No.: PCT/FR82/00224
 § 371 Date: Aug. 31, 1984
 § 102(e) Date: Aug. 31, 1984
[87] PCT Pub. No.: WO84/02792
 PCT Pub. Date: Jul. 19, 1984
[51] Int. Cl.[4] ............................................. G10D 1/02
[52] U.S. Cl. .................................................... 84/282
[58] Field of Search ......................................... 84/282

[56] References Cited

U.S. PATENT DOCUMENTS

| | | | |
|---|---|---|---|
| 2,693,107 | 11/1954 | Paden | 73/89 |
| 3,304,770 | 11/1967 | Dixon | 73/100 |
| 3,308,706 | 3/1967 | Brilhart | 84/380 |
| 3,440,918 | 4/1969 | Wurlitzer | 84/282 |
| 4,015,501 | 4/1977 | Schaller | 84/282 |

FOREIGN PATENT DOCUMENTS 3001521 4/1981 Fed. Rep. of Germany .

OTHER PUBLICATIONS

PCT International Application No. PCT/CH82/00034 dated Mar. 4, 1982, (WO82/03274 Sep. 30, 1982).
"Making Better Musical Instruments from Graphite Composites" from Mechanical Engineering, Mar. 1976.

Primary Examiner—Benjamin R. Fuller
Attorney, Agent, or Firm—Armstrong, Nikaido, Marmelstein & Kubovcik

[57] ABSTRACT

Fiber-reinforced bow stick having an elongated central core of light-density material surrounded by plural resin-impregnated bundles of plural roves of fibers. The bundles longitudinally extend from a frog-end of the bow stick to an opposite end adapted to receive and hold one end of a set of hairs extending from that end to the frog-end. The frog-end of the bow stick is adapted to hold a frog for receiving the other end of the set of hairs.

14 Claims, 5 Drawing Sheets

BOW STICK MADE OF REINFORCED RESIN FOR STRINGED INSTRUMENTS

For some years, professionals in the stringed instrument industry have been wondering about the scarcity, the quality and the prices of the woods used in the constitution of musical stringed instruments.

Concerning bows requiring hard woods with high mechanical performance, such as PERNAMBOUC, imported from Brazil, the problems of supply are raised in the same manner. The considerable increase, during recent decades, in consumption for building and furniture necessitate fellings made increasingly towards the hotter and more humid heart of the forest. This results in species of trees which have increasingly slack fibrous structures, which gives the objects reduced mechanical characteristics.

Furthermore, exporters faced with this situation, conscious of the perspectives of shortage (the cycles of regeneration of these species of trees last centuries), tend to raise their prices and institute more and more rigid supply regulations, particularly concerning the freedom of choice of the batches.

This situation therefore incites a search for satisfactory solutions of replacement, in order to protect this branch of art.

Thus, the new composite materials with high mechanical performance (high modulus of elasticity and high resistance for a low density) such as the carbon fibers recently marketed, are the only ones to be able to provide a solution, as we have been able to check by making prototypes in accordance with the process described hereinafter.

Figure 1:
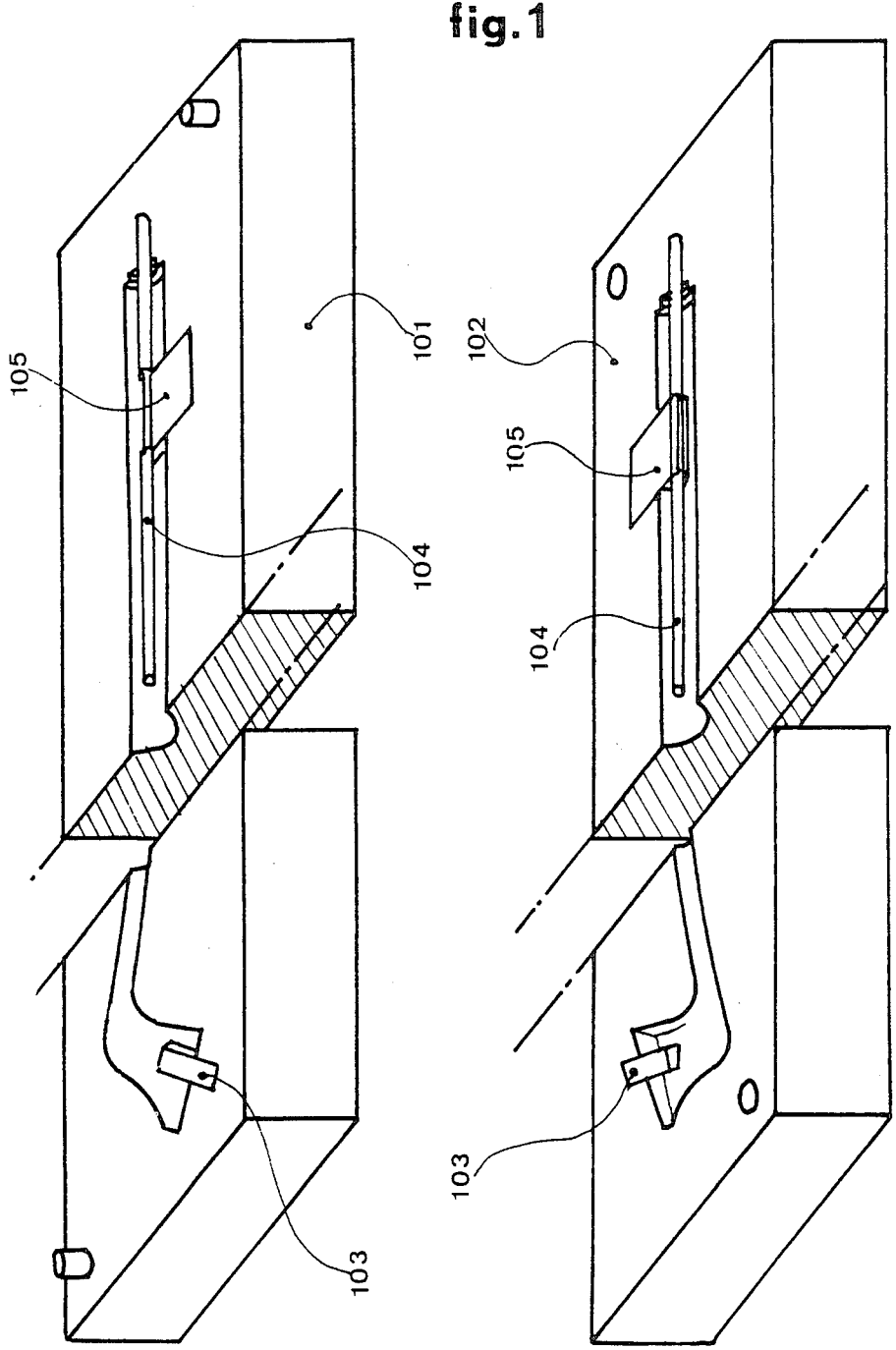
FIG. 1—shows open mould half-shells used in preparing the present invention.

This process, which we propose to develop, is dependant on the technique of moulding by mould in symmetrical half-shells with respect to the plane of symmetry of a conventional model stick (FIG. 1) and on that of "draping" or "stratification" of the unidirectional filamentary materials coated with resin polymerizing at ambient temperature.

It consists, more precisely (FIG. 2), in disposing, longitudinally, bundles 201 of roves of carbon fibers, previously impregnated with a pigmented resin, in the two half-cavities of the moulds 101, 102.

These half-shell moulds 101, 102 are provided with two centering studs ensuring perfect position of the two elements at the moment of assembly thereof by gluing or overmoulding. Moreover, they are provided with "cores" ensuring reproduction of all the functional recesses of the conventional bow stick (FIGS. 1 and 2), namely:

the mortise of the point 202 cores 103, 103)
the mortise 203 for housing the screw-nut system for tensioning the hair cores 105, 105)
the bore 204 for passage of the screw of the control knob cores 104, 104)
the front bearing surface of this screw 205 (cores 104, 104).

These moulds may either be metallic with the cavity engraved thereinto or made much more economically with the aid of a wooden frame filled with a silicon resin which will ensure direct overmoulding of the model stick.

The number and the different lengths of the roves of carbon constituting the bundles 201 on which the mechanical properties of the stick finally depend are defined by the calculation which takes into account the characteristics of the fiber (density, section, modulus of elasticity), those of the resin (density, modulus of elasticity) and of the rigidity which it is desired to give the stick.

The mathematical expression giving the number N of roves as a function of the section D (variable along the stick) is for a half-impression:

$$N = \frac{\pi}{8} \times \frac{E_B - E_R}{E_F - E_R} \times \frac{D^2}{S_C}$$

where
$E_F$ is the modulus of the carbon fiber
$E_R$ that of the resin
$E_B$ that of the wood which it is proposed to replace
D the diameter of the stick at a considered point of the length thereof
$S_C$ the section of the rove of carbon fiber.

The system of resin intended for coating the carbon fibers has been chosen as a function of the following criteria:
good compatibility with the carbon fiber, particularly from the point of view of wettability,
condition of implementation (polymerization at ambient temperature to avoid deformations after firing),
good resilience (resistance to shock), and
aptitude to pigmentation.

The system retained is of the "supple epoxide resin" type polymerizing "cold" which gives it the expected properties, i.e.:
a modulus of elasticity of 2000 MPa and
an elongation at rupture of 8 to 10%.

A violincello bow stick has been made in accordance with the present process by way of demonstration.

Its definition has been established from the characteristics of weight and of elasticity of a conventional stick of PERNAMBOUC wood. The diagram of FIG. 3 makes it possible to judge the result obtained.

Figure 4:
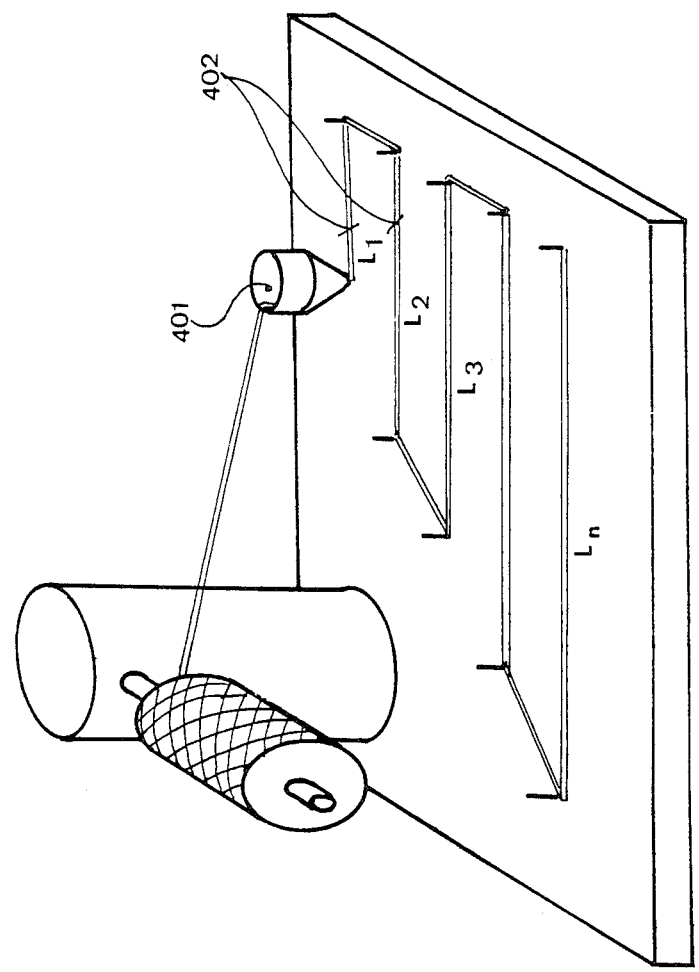

The preparation of the bundles of roves is effected on an adapted work surface illustrated in FIG. 4. This device makes it possible to group together the operations of delivery, of coating (401) of the roves 402 and of constitution of the bundles to their desired length.

After deposit of a separator agent (demoulding) in the cavities of the moulds, a certain quantity of the previously mixed and pigmented resin is cast so as to constitute the outer "skin" of the pieces.

Figure 2:
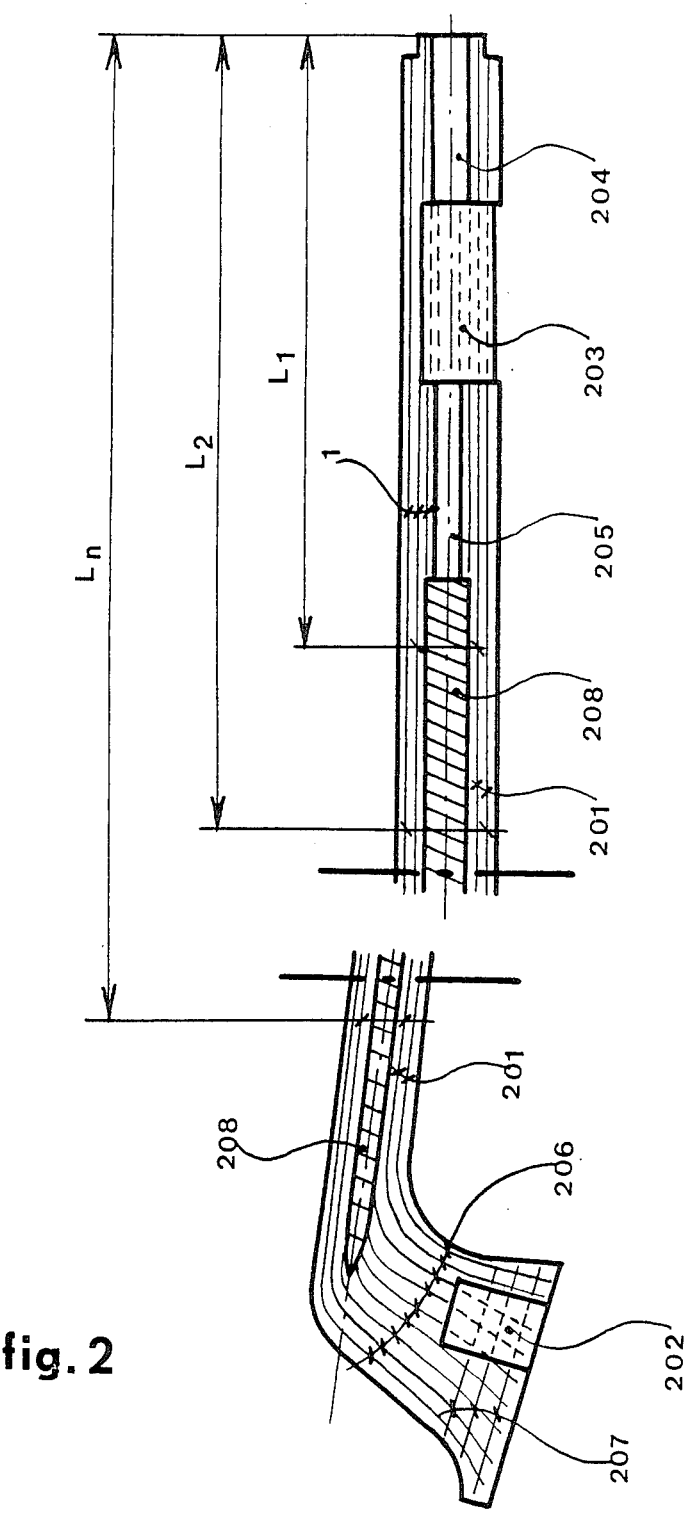
FIG. 2—shows a cross-sectional view of the present invention.

Draping of the bundles in the moulds is effected in accordance with the configuration shown schematically in FIG. 2, beginning with the principal bundle extending and broadening in the point 206. A few roves 207 for reinforcing the mortise 202 are disposed perpendicularly to the paths of the principle bundle.

After the deposit of the other bundles, a sectioned central core 208 made of a low-density material (balsa or expanded polystyrene) is inserted and fixed in the axis of the two half-elements.

After observation of the time necessary for polymerization at ambient temperature, one proceeds with demoulding, dimensioning of the thickness of the two elements of the stick, then with provisional assembly thereof by double-face adhesive to enable controls of mass and of position of the centre of gravity.

Although specifications relative to the position of the centre of gravity of the bow sticks do not yet exist, it would be possible, at this stage of the process, to make corrections either at the point by trimming or ballasting, or by ballasting in line with the front bearing surface of the screw of knob 205.

Final assembly of the two elements of the stick is then ensured by gluing under pressure, at ambient temperature, with the aid of the same system of resin described hereinabove, which will thus ensure perfect mechanical homogeneity of the whole.

Correct hold of the two elements in their relative position during hardening of the glue is obtained by positioning thereof in their respective cavities and provided with their cores. After closure of the mould, a mechanical pressure is exerted so as to drive out the excess glue.

The last finishing operations before conventional assembly of the bow consist in burring the excess of glue, sanding and polishing the stick.

Figure 3:
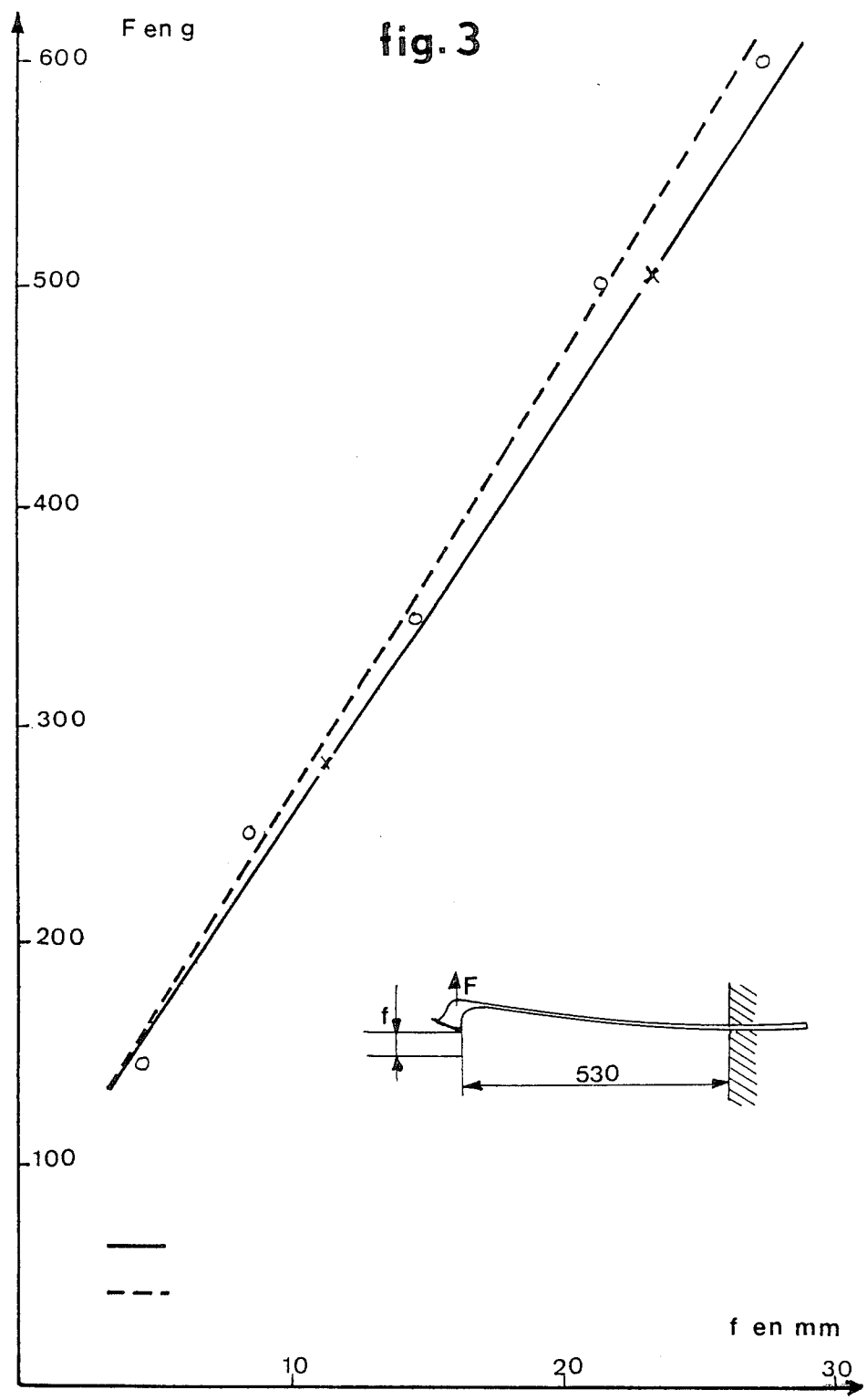
FIG. 3—shows a graph of force verses deflection showing the characteristics of the present invention, FIG. 4—shows an apparatus used in preparing the bundles used in the present invention, and FIG. 5—shows an apparatus used in testing the present invention.
Figure 5:
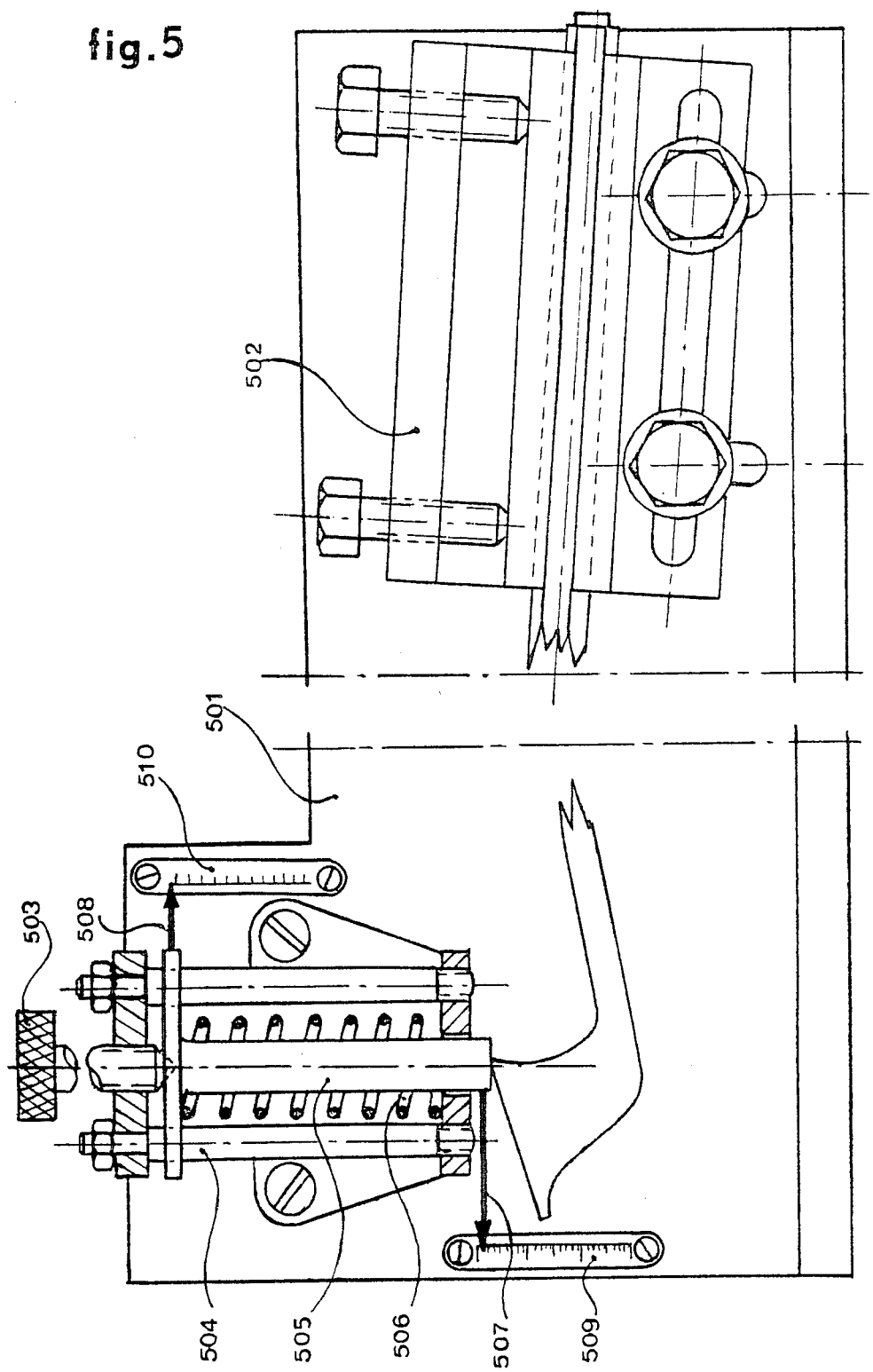

Control of the characteristic of elasticitiy of the stick is effected by the bending test of the type with one end fixed (cf. the diagram accompanying FIG. 3). This simple test may easily be carried out with the aid of the apparatus of which the principle is illustrated in FIG. 5. It comprises a frame 501 supporting a system 502 for clamping the frog end of the stick, thus ensuring the desired fixing.

This clamping system is adjustable in position in the vertical plane of the frame and lateral plane of the vise 502 in order to take into account the various shapes and dimensions depending on the types of sticks. Level with the point of the bow, the frame supports the system of application of the effort constituted by:

a screw 503 screwing in the stirrup 504 connected to the frame and acting on the piece 505 ensures compression of the calibrated spring 506. The piece 505 bears two indices 507 and 508 allowing reading on the one hand of the displacements of the point of the bow on the graduated rule 509 fixed to the frame and, on the other hand, of the force applied read on the rule 510.

The advantages following from the use of the present process for making bow sticks made of composite material, with respect to the present state of the art, are numerous. In fact, in addition to the fact that it constitutes a satisfactory palliative to the possible deficiencies of the natural materials, this process brings the following advantages:

simple industrial implementation requiring only little fashioning with a tool, comparatively to that of the conventional sticks made of wood requiring exceptional manual skill or even with respect to other processes (Patent for Invention No. 1515007 G10D PV No. 77682 "Improvements in musical instrument bows") by circumferential winding of fibers in that case requiring special winding machines.

precise and continuous adjustment of the mechanical properties of rigidity and of the mass of the stick thus allowing a rapid optimization of the definition of a bow as a function of the personal desiderata of the artist.

respect of the present general form peculiar to each type of instrument, this form resulting from long evolution through several centuries.

a greater overall mechanical strength for a mass equivalent to conventional bows, thanks to the longitudinal arrangement of the bundles of fibers parallel to the neutral fiber of the stick, comparatively to other arrangements, or, in the case of sticks of wood whose texture is correctly oriented, but interrupted at random by the cutting tool.

this aspect is even more advantageous in the critical zone of the point where, thanks to the extension 206 of the paths of the roves of the principal bundle of the shank of the stick and to their distribution in whole extent of the point, a solidity is obtained here which is clearly superior to wooden sticks.

a better stability in time to ageing and to the variations in temperature and hygrometry of the ambient atmosphere. Carbon does not age and its coefficient of thermal expansion is virtually negligible.

the process by moulding of the bow sticks furthermore ensures the interchangeability with the added accessories (frog and screws) which would be manufactured in accordance with a process of moulding. At present, manual production renders interchangeability of these accessories impossible.

finally, the choice of the longitudinal arrangement of the bundles of fibers ensures, to a certain extent, anaesthetic appearance recalling that of the grain of the wood, since the orientation of the texture of the latter coincides with that of the fibers of carbon roves of the present process.

What is claimed is:

1. A fiber-reinforced composite bow stick for a stringed musical instrument comprising:
an elongate central core of a light-density material and plural resin-impregnated bundles of plural roves of fibers disposed around and surrounding said central core, said bundles longitudinally extending from a frog-end of said bow stick to an opposite end adapted to receive and hold one end of a set of hairs extending from said opposite end to said frog-end, said frog-end being adapted to hold a frog for receiving the other end of said set of hairs.

2. The bow stick of claim 1, wherein said frog-end is provided with a longitudinally extending bore along a central axis of said stick for mounting of a screw for controlling position of the frog and for balancing of said stick.

3. The bow stick of claim 1, wherein additional roves of fibers are disposed at said opposite end perpendicularly to said plural roves.

4. The bow stick of claim 1, wherein said light density material is selected from the group consisting of balsa and expanded polystyrene.

5. The bow stick of claim 1 wherein said resin impregnated bundles are impregnated with an epoxide resin.

6. The bow stick of claim 1, wherein a number N of roves of said fibers at a given position along said stick having a diameter D is determined by:

$$N = \left(\frac{\pi}{4}\right)\left(\frac{E_B - E_R}{E_F - E_R}\right)\left(\frac{D^2}{S_C}\right),$$

$E_B$ being a desired modulus of elasticity of said stick, $E_F$ being a modulus of elasticity of said fibers, $E_R$ being a modulus of elasticity of the resin impregnated into said bundles, and $S_C$ being a cross-sectional area of one rove of fibers.

7. A fiber reinforced composite bow stick for a stringed musical instrument including an elongated body extending along a longitudinal axis, said body being composed of a composite material comprising a resin and plural roves of fibers embedded in said resin and extending longitudinally, said bow stick being produced by the process comprising:

preparing roves of fibers of different lengths, coating the roves with a resin, casting a certain quantity of the resin in two elongated and symmetrical half-shell molds provided for molding two half-sticks, longitudinally depositing and draping said coated roves in said half-shell molds, polymerizing said resin, removing said half-sticks from said molds, and gluing said half-sticks together with said resin.

8. The bow stick as claimed in claim 7 wherein as said coated roves are draped, the roves at one end of each half-shell mold are spread and broadened.

9. The bow stick as claimed in claim 8, wherein additional coated roves are deposited at said one end perpendicularly to said coated roves.

10. The bow stick as claimed in claim 7, wherein prior to polymerizing, a central core of a low-density material is inserted along said longitudinal axis.

11. The bow stick as claimed in claim 7 wherein the polymerizing is carried out at ambient temperatures.

12. The bow stick as claimed in claim 7, wherein said fibers are carbon.

13. The bow stick of claim 1, wherein said fibers are carbon.

14. The bow stick of claim 1, wherein said bundles of plural roves of fibers are fixed to said central core.

* * * * *